Figure 1:
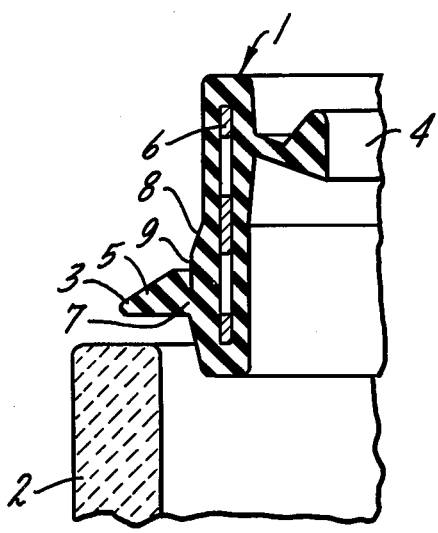

United States Patent [19]
Arlt et al.

[11] 4,213,619
[45] Jul. 22, 1980

[54] SEALING INSERT FOR THE TIGHT CONNECTION OF TWO PIPES

[76] Inventors: Christian Arlt, Weinstrasse 14, Dinkelackerring 38, 6730 Neustadt; Gerhard Arlt, 6836 Oftersheim, Neustadt, both of Fed. Rep. of Germany

[21] Appl. No.: 915,402

[22] Filed: Jun. 14, 1978

[30] Foreign Application Priority Data

Jun. 15, 1977 [DE] Fed. Rep. of Germany ....... 2726959

[51] Int. Cl.² .............................................. F16J 15/02
[52] U.S. Cl. ........................ 277/207 A; 277/DIG. 2
[58] Field of Search ................... 277/207, 207 A, 212, 277/211

[56] References Cited
U.S. PATENT DOCUMENTS

| | | | |
|---|---|---|---|
| 3,386,745 | 6/1968 | Hein | 277/207 A |
| 3,414,273 | 12/1968 | Sumner | 277/207 A |
| 4,084,827 | 4/1978 | Wolf | 277/DIG. 2 |

*Primary Examiner*—Robert I. Smith
*Attorney, Agent, or Firm*—Kinzer, Plyer, Dorn & McEachran

[57] ABSTRACT

Sealing insert with axial support wall having a reduced diameter portion for receiving the reinforcing section of an attached radial seal ring upon axial expansion of a thinner bridge portion by which the seal ring is attached.

2 Claims, 8 Drawing Figures

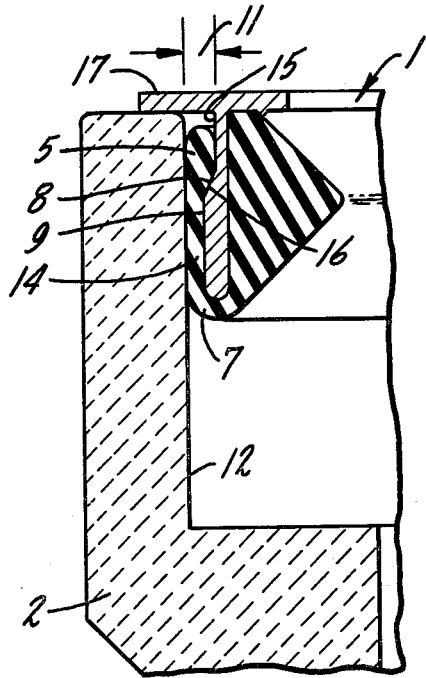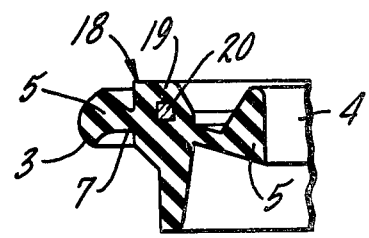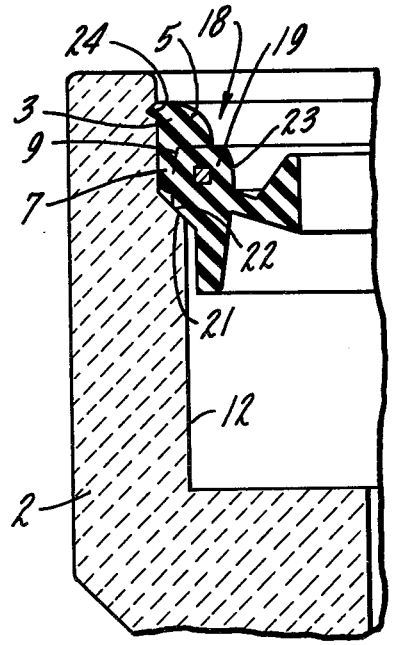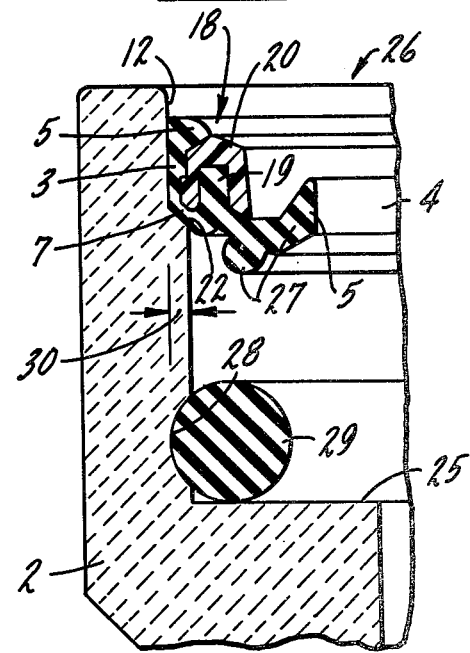

SEALING INSERT FOR THE TIGHT CONNECTION OF TWO PIPES

The invention relates to a sealing insert for the tight connection of two pipes, whereby at its radial exterior side at least one wholly or partly elastic sealing ring is applied over the radial extension of said insert, the cross-sectional reinforcement of said ring being connected via a bridge thinner in cross-section with the sealing insert, and in its mounted position the ring is supported by a compression support of the sealing insert placed radially and inwardly.

In a pipe connection according to prior art a sealing ring has as supporting part a cylindrical ring with an outer annular sealing part being arranged at the exterior side of said sealing ring in the form of an L-shaped annular lip. Because the sealing of the pipe connection to the sealing ring placed therebetween only is accomplished at the radial exterior side of the ring via the L-shaped annular lip, the radially exterior leg of this L-shaped annular lip must be designed relatively strongly in cross-section, in order to be able to safely seal the pipe connection also in case of shearing stresses when those occur. With pipes which, like for example clay pipes, which may have larger radial diametrical tolerances at their sleeves difficulties may arise at still admissible narrow and most narrow sleeve diameters, when such a sealing ring is to be mounted with an L-shaped annular lip of relatively strong cross-sectional design in the sleeve. The contact pressure applied by this L-shaped annular lip on the inner wall of the sleeve thereby can become so large that the sleeves may burst (see German Publication Copy 25 36 253).

If the supporting part of the sealing ring is not made from rubber or the like, but entirely from harder synthetic material, the entire sealing ring possibly may no longer be mountable at all in the sleeve at narrow and most narrow inner sleeve diameters (see German publication copies 2,135,841 and 2,151,664). In another sleeve pipe seal the jacket of a sealing insert is connected to the bottom perpendicular to the axis of the sleeve, said bottom located axially and externally ahead of the inner cylindrical sleeve wall, preferably by pasting. That way the sealing insert is held firmly in transit from the pipe plant until the pipes are laid at the construction site, in the sleeve. A pasted connection between rubber, of which the sealing insert usually is made, and the different pipe materials, like clay, requires utmost care, like for example roughing of the adhesion surface of the rubber, an absolutely dry pasting base at the pipe possibly pretreated with primer, etc., so that the expenditure in time and labor caused thereby leads to considerable additional costs. Nevertheless, the durability of such pasting in case of prolonged storage of the pipes in the open air only is of limited duration, so that the sealing inserts eventually applied only loosely in the sleeve may be removed without authorization (see German Utility Pat. No. 7,517,728).

The invention is based on the problem of improving the mountability of sealing inserts, tight inserts or the like and to prevent the danger of burst sleeves. This problem is solved according to the invention by a sealing insert of the initially described kind in that the cross-sectional reinforcement of the radially exterior sealing ring is spaced in the pre-mounting position axially so far from a radial reduction of the outer diameter of its radially and inwardly placed contact support or from its axial end, that the cross-sectional reinforcement of the radially external sealing ring is urged during the mounting of the sealing insert at least with radially narrow or most narrow sealing surface distances under axial expansion of the bridge of the radially external sealing ring of the bridge/with thinner cross-section, wholly or partly into the radial reduction of the outer diameter of its radially inwardly placed contact support or beyond the axial outer end of this contact support. That way additional annular space is created for the radially externally arranged sealing ring at the sealing insert at least with radial narrow and most narrow sealing surface spaces, whereby the cross-sectional reinforcement of the sealing ring can be pressed with the mounting of the sealing insert into said annular area. The stronger axial expansion of the bridge of the sealing ring with thinner cross-sectionally causes the cross-sectional reinforcement of the sealing ring to be pressed firmly against the sealing surface and the sealing insert, so that thus as a result of the reduction of this reduction of the outer diameter of the contact support coming to rest radially and inwardly cannot cause any reduction of the sealing safety of the pipe connection. The same result is obtained in a design where the cross-sectional reinforcement of the sealing ring is urged beyond the axial end of this contact support. Because the cross-sectional reinforcement of the sealing ring in each case is pressed firmly against the surfaces to be sealed, the sealing insert thereby is clamped additionally in the pipe connection, so that its undesirable dismantling is complicated very much or rendered impossible. These advantages of the invention are accomplished substantially in that the cross-sectional reinforcement of the sealing ring arranged radially and externally at the sealing insert can be dimensioned as to size and thus also with regard to the contact preponderantly in accordance with the sealing requirements with the presence of radially widest admissible sealing surface distances of pipes. A largely dimensioned cross-sectional reinforcement of the sealing ring accomplished according to these criteriae would possibly render the mounting of the sealing insert in radially narrow and most narrow sealing distances entirely impossible on account of the too high compression and thus insertion resistance. In this case the radial outer diameter reduction of the contact support coming to rest radially and inwardly sees to it that the cross-sectional reinforcement of the sealing ring can slide into this radially somewhat wider annular area created by the radial reduction of the outer diameter of the contact surface, and thereby the sealing insert can be mounted perfectly.

An undesirable dismantling of the sealing insert fastened in the sleeve can be inhibited very simply by the radially outer sealing surface, like for instance the inner sleeve wall having in the proximity of the sleeve outlet a groove-like recess or the like into which the cross-sectional reinforcement of the radially external sealing ring of the sealing insert mounted in the sleeve and subjected to contact pressure is able to engage.

Figure 2:
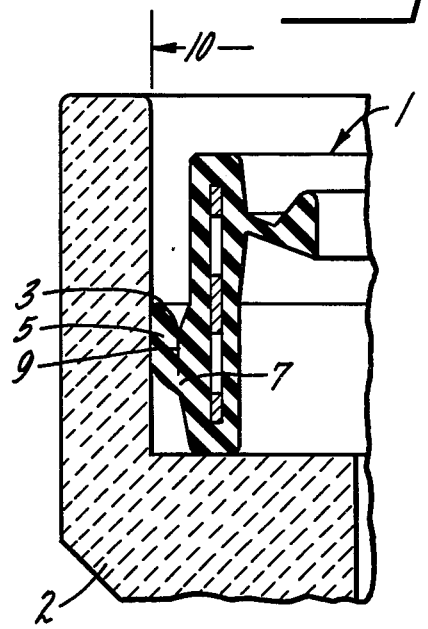
Figure 3:
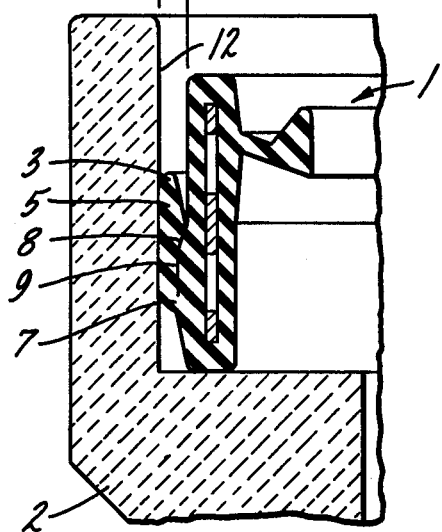
Figure 4:
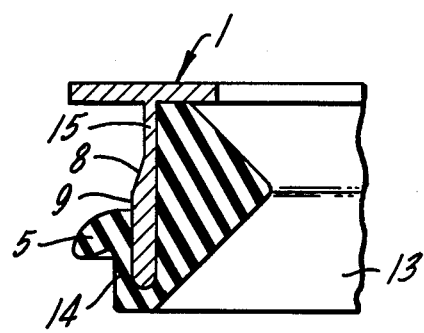

Some variants of the subject of the invention are elucidated more in detail in the appended drawing. In the sectional cross-section, FIG. 1 shows a sealing insert for sealing sleeve pipes, FIGS. 2 and 3 show the same sealing insert after having been mounted in the sleeve of a pipe, FIG. 4 shows a sealing insert in the form of a roller ring which was connected to a clamping ring, FIG. 5 shows the same sealing insert after its mounting in a sleeve, FIG. 6 shows a sealing insert before, and according to FIG. 7 the same sealing insert is shown after having been mounted in a sleeve, FIG. 8 shows a sealing insert similar to that of FIG. 7 after it has been mounted in a sleeve, The sealing insert 1 represented in FIG. 1 is used to seal the free sleeve gap located between the sleeve 2 of a pipe and the pointed end of a telescoping pipe. A sealing ring 3 (outside) and 4 (inside) is arranged at the radial exterior and interior side of the sealing insert in each case with a cross-sectional reinforcement 5. A flexion-resisting insert 6 causes the required stability of the form of the sealing insert 1. The radial outer diameter reduction 8 of the contact support 9 coming to rest radially and inwardly of the radially outer sealing ring is located axially a short distance behind the thinner bridge 7 of the radially external sealing ring 3.

FIG. 2 shows the sealing insert 1 mounted in the sleeve 2 of a pipe. The radial sealing surface distance 10 which here corresponds with the radial inner diameter of the sleeve is located in this case for example at the most widely admissible plus limit of tolerance. The cross-sectional reinforcement 5 of the radially outer sealing ring 3 is pressed directly behind the extension of the bridge 7 against the radial outer wall of the sealing insert 1 used as contact support 9.

In FIG. 3 the radial sealing surface distance 10 of the sleeve 2 as shown is located for example at the lower admissible diametrical borderline. On account of the annular area 11 thereby narrowed in radially in a corresponding manner and located between sealing insert 1 and the inner sleeve wall 12 the cross-sectional reinforcement 5 of the radially outer sealing ring 3 was urged during the mounting of the sealing insert 1 in the sleeve 2 into the radial outer diameter reduction 8 of its radial contact support 9 coming to rest radially and inwardly, said urging having been effected axially. The bridge 7 of the radially outer sealing ring 3 is expanded considerably, thus pressing the cross-sectional reinforcement 5 of the sealing ring 3 radially and with adequate firmness against the contact surface 9 and the inner sleeve wall 12.

The sealing insert 1 represented in FIG. 4 comprises a roller cage 13, a roller cage cuff 14 originating from the roller cage and a clamping ring 15 arranged between these two parts. With its radial exterior side this clamping ring 15 forms the radially and inwardly placed contact surface 9 for the cross-sectional reinforcement 5 of the roller cage cuff 14. A short distance ahead of this cross-sectional reinforcement 5 of the roller cage cuff 14 the radial outer diameter reduction 8 of the radial outer wall of the clamping ring 15 used as contact support 9 is placed.

The sealing insert 1 represented in FIG. 4 is located, according to FIG. 5, in the sleeve 2 of a pipe, where it is held firmly by the cross-sectional reinforcement 5 of the roller cage cuff 14 pressed between the inner sleeve wall 12 and the radial external side of the clamping ring 14. The part of the roller cage cuff 14 designed as a thinner bridge 7 is considerably stretched axially so that its cross-sectional reinforcement 5 could slide during the mounting of the sealing insert 1 into the radially slightly wider annular area 11 created by the radial outer diameter reduction 8 of the contact surface 11. As a result of the undercutting 16 created by the radial outer diameter reduction 8 of the contact surface 9 at the clamping ring 15 the sealing insert 1 is held reliably and firmly in the sleeve 2, whereby considerable contact pressure exerted by the radially pressed cross-sectional reinforcement 5 of the roller cage cuff 14 upon the inner sleeve wall 12 and the clamping ring 15 acts as a brake against an undesired axial pulling out of the sealing insert 1, from the sleeve 2. The axially protruding annular collar 17 protruding externally at the clamping ring 15 on the frontal wall of the sleeve 2 limits the axial insertion depth of the sealing insert 1 in the sleeve to the measure which is operationally necessary.

FIG. 6 shows a sealing insert 18 made of elastic material with a bending-resistant ring 20 made of metal being inserted into the supporting body 19 of said insert. The sealing ring 4 protruding radially and inwardly from the supporting body 19 bears a cross-sectional reinforcement 5 at its end. An outer sealing ring 3, consisting of the bridge 7 and the cross-sectional reinforcement 5 protrudes radially outwardly from the radial exterior side of the supporting body 19. The connection between the bridge 7 and the supporting body 19 is located at the part of the outer side of the supporting body 19 oriented in mounting position axially with regard to the sleeve level.

In FIG. 7 the sealing insert 18 is placed clamped in the sleeve 2 of a pipe. The conically extending part of the radial external side 21 of the supporting body 19 is seated at a radial protrusion 22 of the inner wall 12, said protrusion extending tapered in the same manner. This radial protrusion 22 prevents too deep an insertion of the sealing insert 18 when it is mounted in the sleeve 2 and also during the mounting of the pointed end. The cross-sectional reinforcement 5 of the radially outer sealing ring 3 was urged outwardly via the axially outer end of the supporting body 19 said end acting as contact support, under powerful axial expansion of the thin bridge 7 of the radially external sealing ring 3. The radial contact pressure originating from this cross-sectional reinforcement 5 of the radially external sealing ring 3 on the inner sleeve wall 12 and on the axial exterior side of the supporting body 19 clamps the sealing insert 18 firmly and dismantling-proof in the sleeve of the pipe (sleeve 2). The same powerful contact pressure of the cross-section reinforcement 5 of the radially exterior sealing ring 3 moreover causes a safe sealing of the contact surface located between the inner sleeve wall 12 and the radial external wall of the supporting body 19, and thereby between sealing insert 18 and sleeve 2. The mounting of the sealing insert 18 in the sleeve 2 is accomplished preferably by using an assembly mold not shown here which is seated at the radial inner side 23 of the supporting body 19. By means of the contact pressure (compressed air cylinder or the like) acting on the axial external side of this mounting mold or by some firm blows with the mallet it is possible to mount the sealing insert 18 in a simple fashion in the sleeve 2. No aid means like adhesive or the like are used for safely fastening the sealing insert 18 in the sleeve 2; this leads to savings in cost by elimination of additional labor and auxiliary materials and to a really permanent fastening of the sealing insert 18 in the sleeve 2. A groove-like recess 24 mounted in the proximity of the sleeve and of the inner sleeve wall 12, into which the cross-sectional reinforcement 5 of the radially external sealing ring 3 is engaged causes an additional axial bolting of the sealing insert 18 in its mounting position in the sleeve 2. The conically extending radial protrusion 22 of the inner sleeve wall 12 offers just secondarily an additional advantage: If for reasons of cost saving the sleeve pipe seal is not to be sealed with a sealing insert 18, but with a pluggable ring which is more favorable as to price, this radial protrusion 22 may be used as axial insertion limit for the pluggable ring. Thus, the same sleeve mold is appropriate for the use of sealing inserts 18 and of pluggable rings, so that the pipe plants can produce for these two different seals pipes with the same sleeve form [German text not quite clear].

According to FIG. 8, the bending-resistant ring 20 of the sealing insert 18 consists of a hard plastic ring (made of polypropylene for example) and having an approximately U-shaped cross-section, which surrounds the supporting body 19 of the sealing insert 18 in three places. The cross-sectional reinforcement 5 of the radially outer sealing ring 3 was urged outwardly during the mounting of the sealing insert 18 beyond the axially outer end of the bending-resistant ring 20 under powerful axial stretching of the thinner bridge 7 of the radially outer sealing ring 3. A firm clamping in of the sealing insert 18 in the sleeve 2 is assured thereby. The radially interior sealing ring 4 has at its radially inner end a cross-sectional reinforcement 5 consisting of one rib 27 each pointing to the sleeve level 25 and to the sleeve outlet 26. The radially inner sealing ring 4, however, also may have other cross-sectional forms like for example the one represented in FIG. 7, because this sealing ring 4 of the sealing insert 18 according to the invention merely needs to seal the sealing gap placed toward the tip end. The sealing gap located between the inner sleeve wall 12 and the sealing insert 18 already is sealed dependably by the cross-sectional reinforcement 5 of the radially external sealing ring 3. The form of the inner sleeve wall 12 shown in FIG. 8 is provided shortly ahead of the sleeve level 25 with a receiving means for the pluggable ring, 28, in which in case of the alternate sealing of the sleeve connection by means of a pluggable ring 29 the latter can be stored or positioned safely when the pipe is in transit. Shortly prior to the insertion of the tip end into the sleeve 2 the pluggable ring 29 is inserted in its pre-mounting position located shortly ahead of the conically extending radial protrusion 22 of the inner sleeve wall 12. The form of the inner sleeve wall 12 shown in FIG. 8 thus makes possible in one and the same design the alternate use of sealing inserts 18 or pluggable rings 29 for sealing the sleeve pipe connection, this considerably simplifies production and inventorying of the sleeve pipes. The wall reinforcement 30 of the sealing area of the sleeve 2 located between the pluggable ring accommodation means 28 and the conically extending radial protrusion 22 of the inner sleeve wall 12 reduces the danger of breakage of the sleeve 2 in transit and during the storage of the pipes quite substantially. As a result of the axial extension of the bending-resistant ring 20, not shown here but technically feasible without problem, as far as the axially external sleeve outlet 26, the use of a mounting mold for mounting the sealing insert 18 in the sleeve 2 can be dispensed with. In that case a few blows with a rubber mallet exerted on the axial extension of the bending-resistant ring 20 suffice to mount the sealing insert 18 in the sleeve 2 appropriately. If the axial extension of the bending-resistant ring 20 moreover is designed in the shape of the ring collar 17 known from FIGS. 4 and 5, radially to extend over to the frontal wall of the sleeve 2, the creation of a conically extending radial protrusion 22 at the inner sleeve wall 12 may be omitted and the sealing insert 18 also may be mounted in conventional smoothly cylindrical sleeves 2.

If, for example, the sealing insert consists of a relative hard and thus only slightly expandable elastomer, it may be advantageous for the radially inwardly positioned contact support to already transcend axially directly or shortly behind the extension of the bridge of the radially external sealing ring at the sealing insert in conical or similar form with or without graduation into its radial reduction of the outer diameter. In this manner, not represented in an embodiment it is possible, even with the use of relatively hard elastomers for example 60°-70° Shore A, which may be advisable for reasons of durability, to realize the advantages of the invention.

We claim:

1. A sealing insert for pipes having a contact support (9) provided at its exterior side with at least one elastic sealing ring having a section (5) of predetermined cross-sectional thickness, said section of said ring being connected via a bridge (7) thinner in cross section to the contact support, and in its mounted position the ring being supported by said contact support of the sealing insert, characterized by the fact that the section (5) of the radially exterior sealing ring (3) is spaced in the premounting position axially from a radial reduction of the outer diameter (8) of the radially and inwardly located contact support (9) or from the outer axial end of said contact support, and the dimensions being such that the section (5) of the radially external sealing ring (3) is urged during the mounting of the sealing insert (1) either with radially narrow (FIG. 2) or most narrow (FIG. 3) sealing surface distances under axial expansion of the bridge (7) into said radial reduction of the outer diameter (8) or beyond the axially outer end of said contact support (9).

2. The sealing insert as defined in claim 1 positioned inside a sleeve and opposed to a surface thereof, characterized by the radially external sleeve sealing surface (12) for example having a groovelike recess (24) into which the cross-sectional reinforcement (5) of the radially external sealing ring (3) of the sealing insert is engaged.

* * * * *